US011498381B2

(12) United States Patent
Huang

(10) Patent No.: US 11,498,381 B2
(45) Date of Patent: Nov. 15, 2022

(54) COMPRESSOR FOR SHOCK ABSORBER

(71) Applicant: SHIFUKANG INDUSTRIAL.CO., LTD., Taichung (TW)

(72) Inventor: Shang-Yuan Huang, Taichung (TW)

(73) Assignee: SHIFUKANG INDUSTRIAL CO., LTD., Taichung (TW)

( * ) Notice: Subject to any disclaimer, the term of this patent is extended or adjusted under 35 U.S.C. 154(b) by 166 days.

(21) Appl. No.: 17/084,146

(22) Filed: Oct. 29, 2020

(65) Prior Publication Data

US 2022/0134827 A1 May 5, 2022

(51) Int. Cl.
*B60G 13/00* (2006.01)
*B60G 15/06* (2006.01)

(52) U.S. Cl.
CPC ......... *B60G 13/003* (2013.01); *B60G 15/063* (2013.01); *B60G 2204/129* (2013.01); *B60G 2206/91* (2013.01); *B60G 2206/921* (2013.01)

(58) Field of Classification Search
CPC ................ B60G 13/003; B60G 15/063; B60G 2204/129; B60G 2206/921; B25B 27/304; F16F 15/04
See application file for complete search history.

(56) References Cited

U.S. PATENT DOCUMENTS 2,043,140 A * 6/1936 Wilmesherr .......... B60C 25/142 269/244
3,237,919 A * 3/1966 Mackay ............... B60G 17/005 254/105
3,384,348 A * 5/1968 Wicker ................. B25B 27/304 254/10.5
4,219,918 A * 9/1980 Klann ................... B25B 27/304 D8/51
4,486,935 A * 12/1984 Kashiwagi ............ B23P 19/048 29/227
4,732,365 A * 3/1988 Kloster ................. B25B 27/304 254/102
4,809,951 A * 3/1989 Klann .................. B60G 15/063 29/227
4,872,644 A * 10/1989 Papapetros ........... B25B 27/304 74/528
4,930,751 A * 6/1990 Hutchins ............... B25B 27/304 29/227
5,907,894 A * 6/1999 Ha ........................ B25B 27/304 29/227

(Continued)

FOREIGN PATENT DOCUMENTS

CN 209190438 U * 8/2019 ............... B24B 9/18
DE 3208510 A1 * 10/1982

(Continued)

*Primary Examiner* — Karen Beck
*Assistant Examiner* — Scott F. Underwood
(74) *Attorney, Agent, or Firm* — Muncy Geissler Olds & Lowe P.C.

(57) ABSTRACT

A compressor for a shock absorber is provided, including a stretching mechanism and a clamping mechanism. The stretching mechanism includes a first main body and a second main body. The first main body is movably connected with the second main body. The clamping mechanism includes a first abutting assembly and a second abutting assembly which are configured to clamp the shock absorber.

6 Claims, 7 Drawing Sheets

(56) References Cited

U.S. PATENT DOCUMENTS

| | | | | |
|---|---|---|---|---|
| 6,336,625 | B1 * | 1/2002 | Liao | B25B 27/304 73/11.04 |
| 2007/0220728 | A1 * | 9/2007 | Bosche | B25B 27/304 29/227 |
| 2009/0013514 | A1 * | 1/2009 | Uzun | B25B 27/304 29/227 |

FOREIGN PATENT DOCUMENTS

| | | | | |
|---|---|---|---|---|
| EP | 0250638 | A1 * | 1/1988 | |
| EP | 0947406 | A2 * | 10/1999 | |
| FR | 2745739 | A1 * | 9/1997 | B25B 27/304 |
| FR | 2777815 | A1 * | 10/1999 | B25B 27/304 |
| FR | 2785561 | A1 * | 5/2000 | B25B 27/304 |
| JP | 3203649 | U * | 4/2016 | |
| TW | I675766 | B | 11/2019 | |

* cited by examiner

COMPRESSOR FOR SHOCK ABSORBER

BACKGROUND OF THE INVENTION

Field of the Invention

The present invention relates to a compressor for a shock absorber.

Description of the Prior Art

Shock absorbers are often applied to vehicles. For example, a shock absorber of a suspension system is used to absorb vibrations generated when the vehicle is passing through an uneven road; a shock absorber of a steering system is used to absorb vibrations generated by steering wheels of the vehicle.

However, for assembling the shock absorber to the vehicle, an assembling head of the shock absorber is mounted to the vehicle, and the shock absorber is pushed by hands or other objects to allow another assembling head of the shock absorber to correspond to the position to be mounted, which is labor-intensive and time-consuming and may damage the shock absorber. Moreover, during disassembling the shock absorber, the shock absorber may be stretched unexpectedly when one said assembling head is detached from the vehicle, which can be dangerous.

The present invention is, therefore, arisen to obviate or at least mitigate the above-mentioned disadvantages.

SUMMARY OF THE INVENTION

The main object of the present invention is to provide a compressor for a shock absorber which is configured to be pressed stably against the shock absorber so as to avoid unexpected stretching of the shock absorber, and the shock absorber is easy to be assembled and disassembled.

To achieve the above and other objects, the present invention provides a compressor for a shock absorber, the shock absorber includes a first assembling head, a suspension unit and a second assembling head which are connected with one another, and the compressor for the shock absorber includes a stretching mechanism and a clamping mechanism. The stretching mechanism includes a first main body, a second main body, a linkage assembly and a driving unit. The first main body and the second main body are disposed on the linkage assembly. The linkage assembly selectively drives the first main body and the second main body to move relative to each other along an operating direction. The driving unit is connected and co-movable with the linkage assembly. The driving unit is configured to be connected with a driving tool to drive the linkage assembly to drive the first main body and the second main body. The clamping mechanism is configured to clamp the shock absorber and includes a first abutting assembly and a second abutting assembly. The first abutting assembly is disposed on the first main body and configured to be abutted against the first assembling head. The second abutting assembly is disposed on the second main body and configured to be abutted against the second assembling head.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
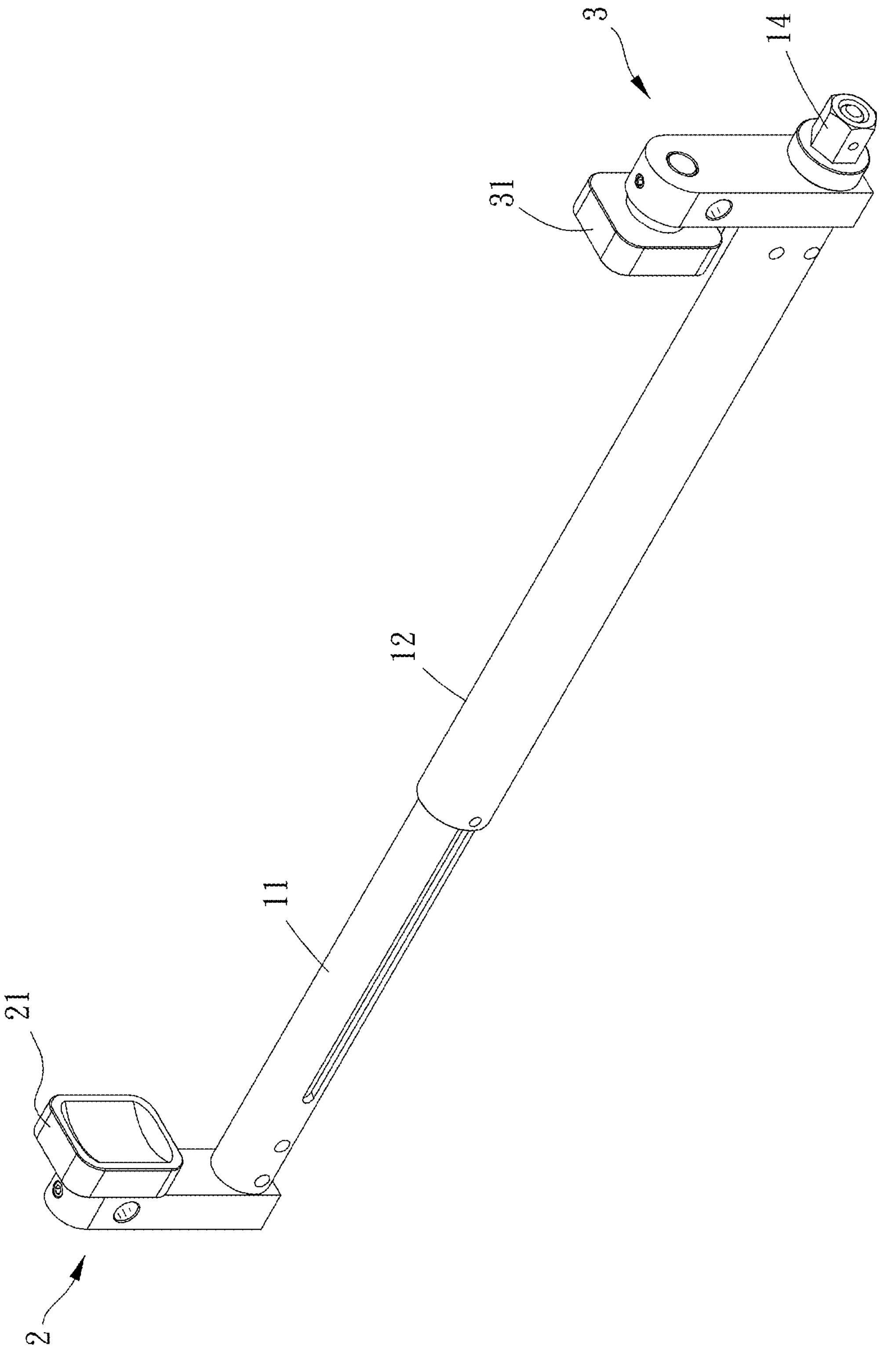
FIG. 1 is a stereogram of a preferable embodiment of the present invention.
Figure 2:
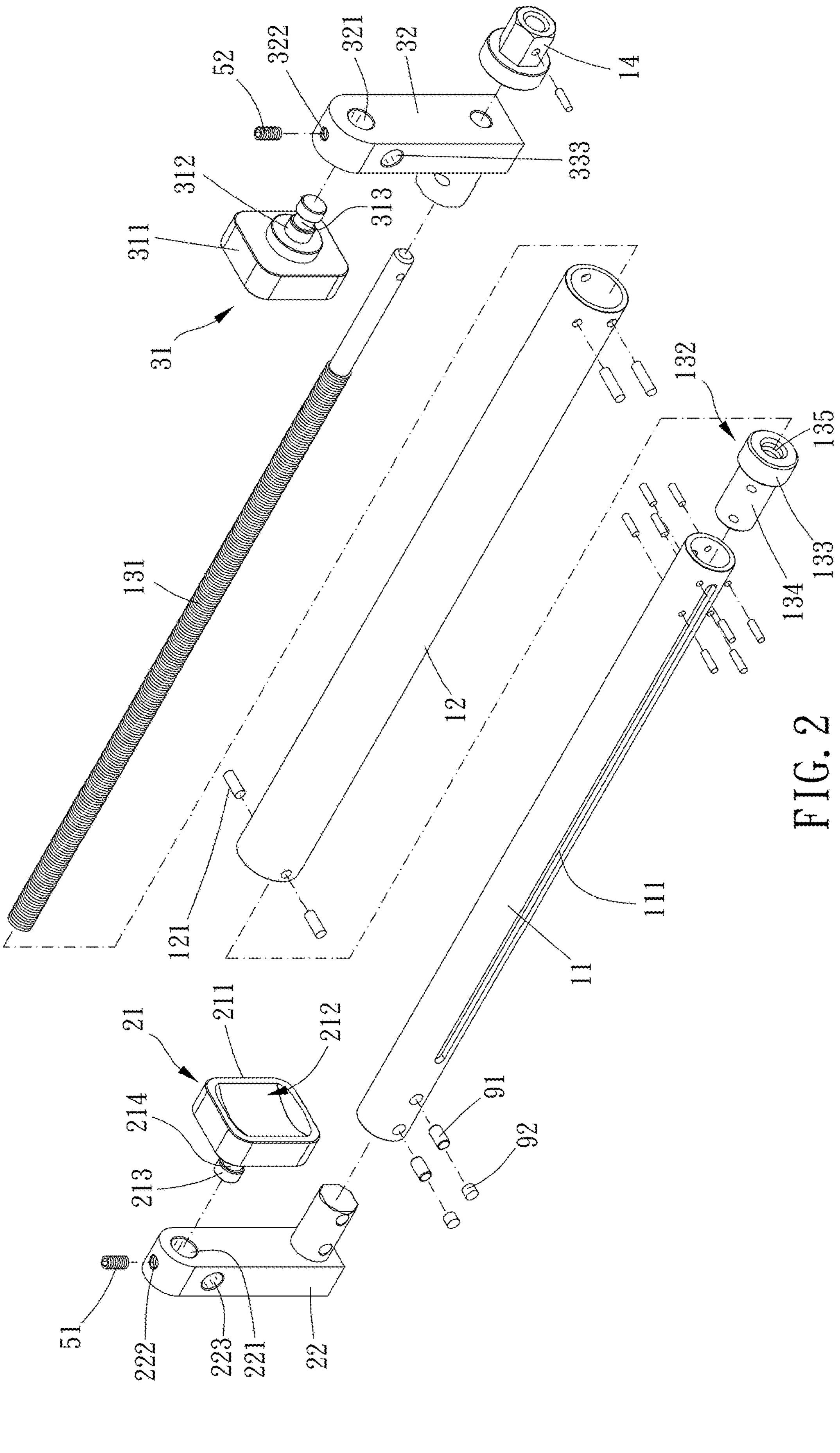
FIG. 2 is a breakdown drawing of FIG. 1.
Figure 3:
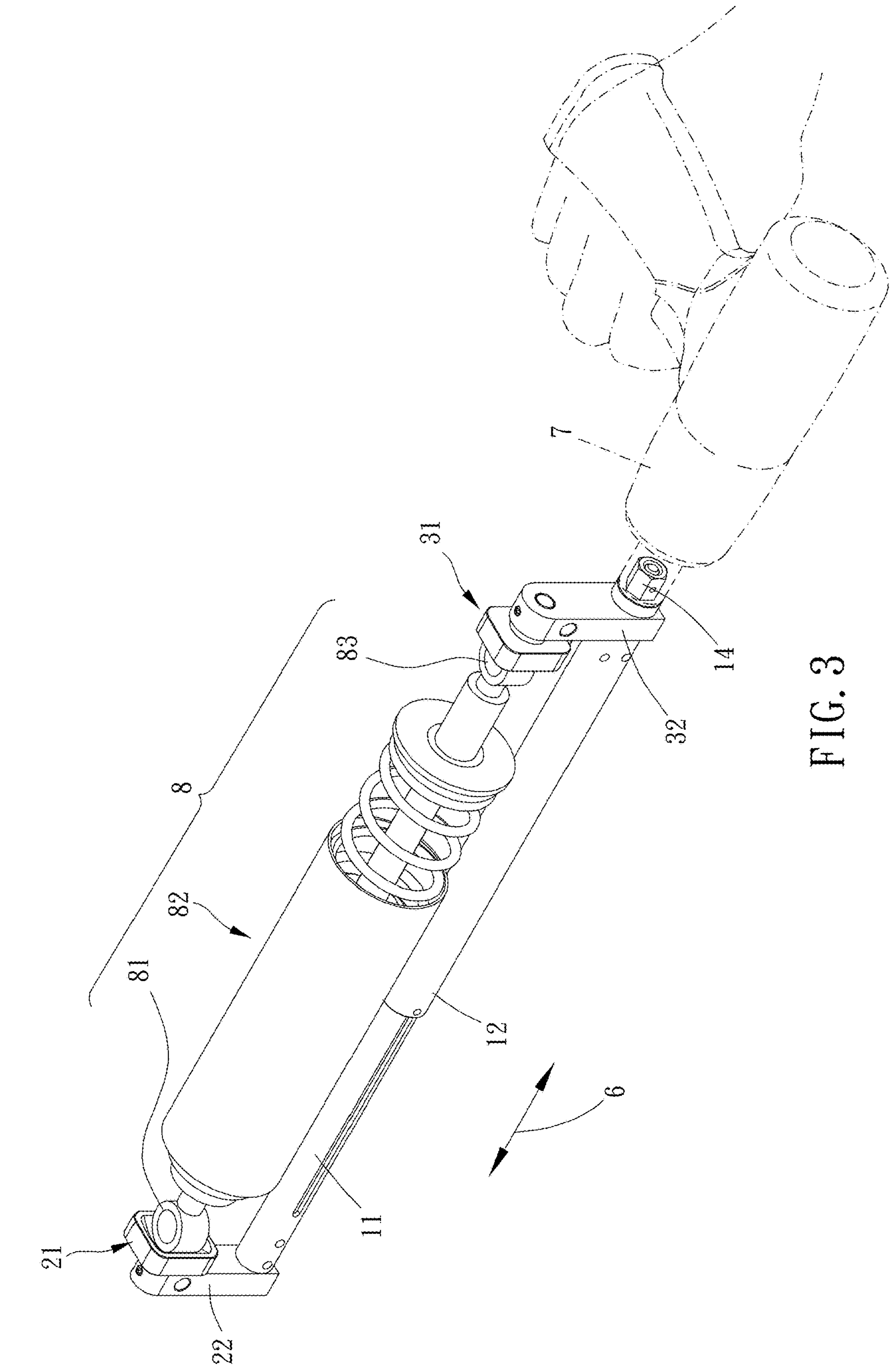
FIG. 3 is a schematic diagram of a preferable embodiment of the present invention during operation.
Figure 4:
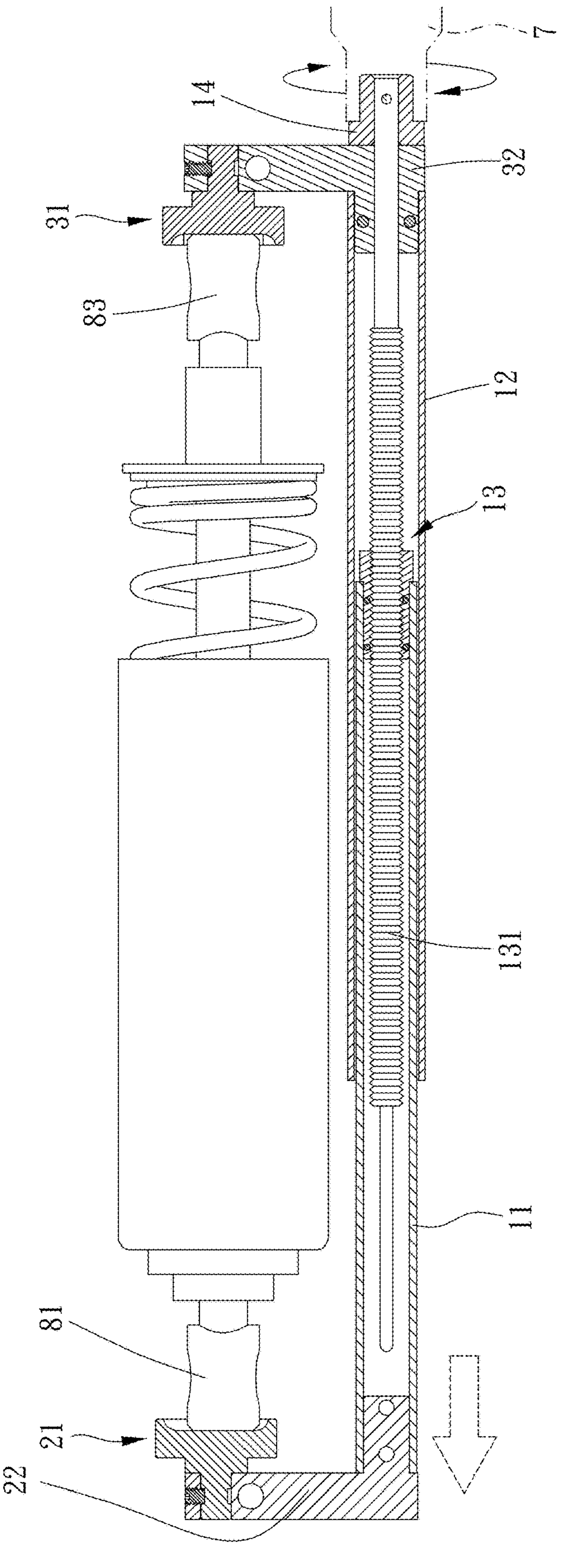
FIG. 4 is a schematic diagram showing loosening operation according to a preferable embodiment of the present invention.
Figure 5:
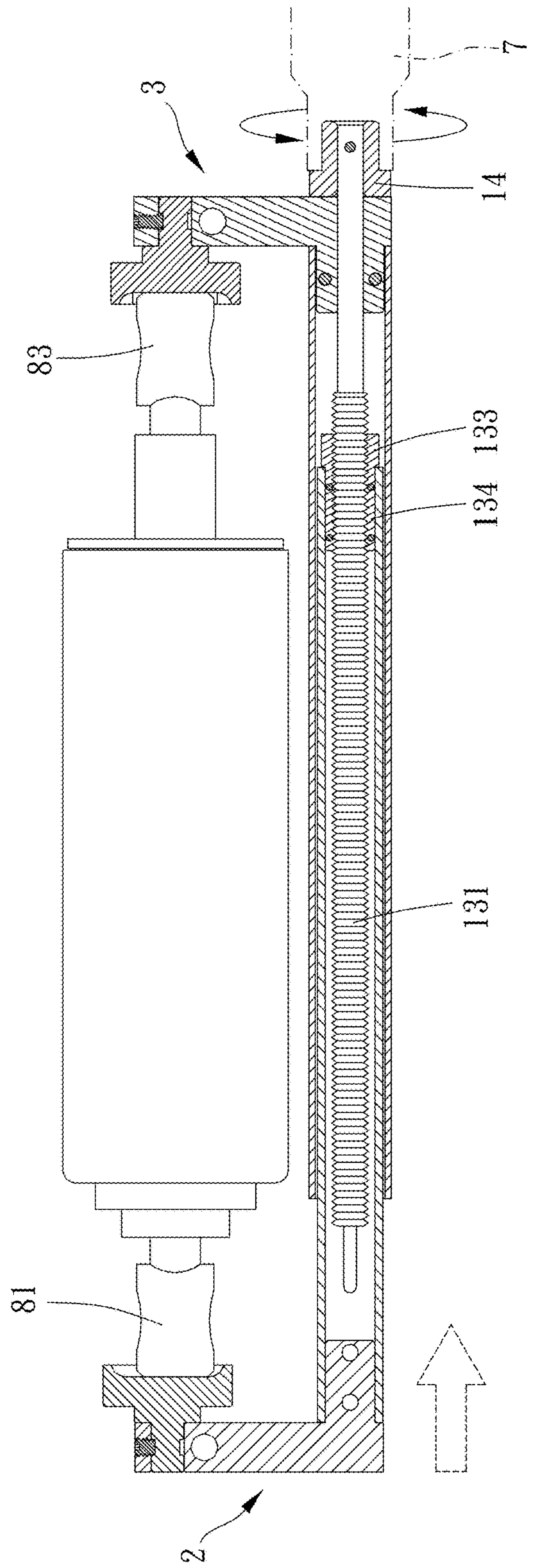
FIG. 5 is a schematic diagram showing compression operation according to a preferable embodiment of the present invention.
Figure 7:
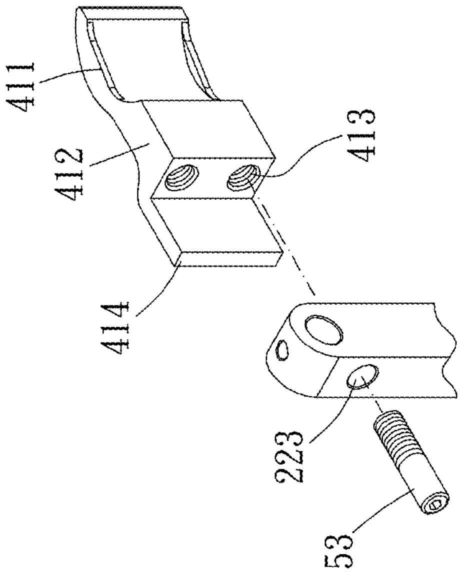
FIG. 7 is a partial breakdown drawing of FIG. 6.
Figure 6:
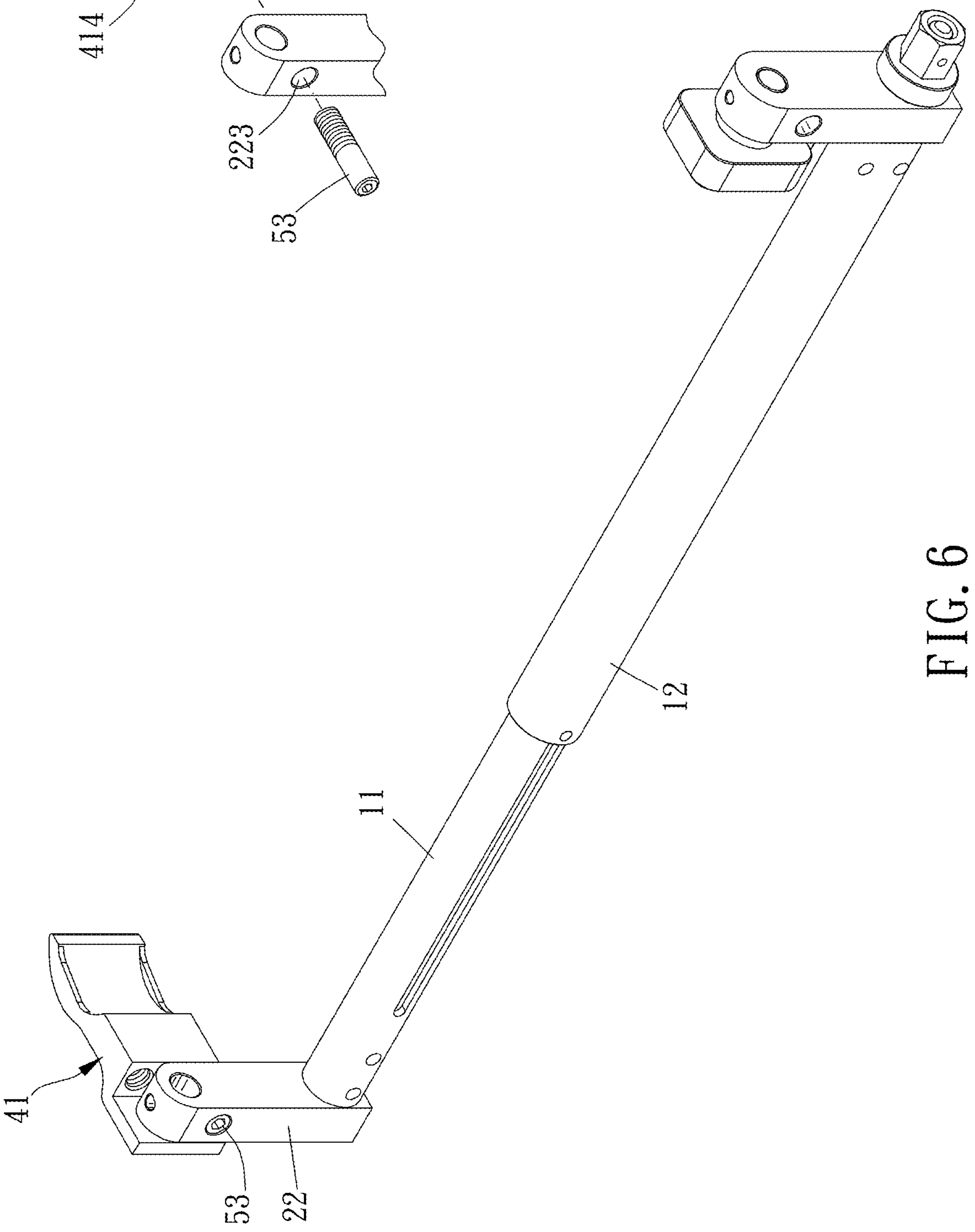
FIG. 6 is a stereogram showing another configuration of a preferable embodiment of the present invention.
Figure 8:
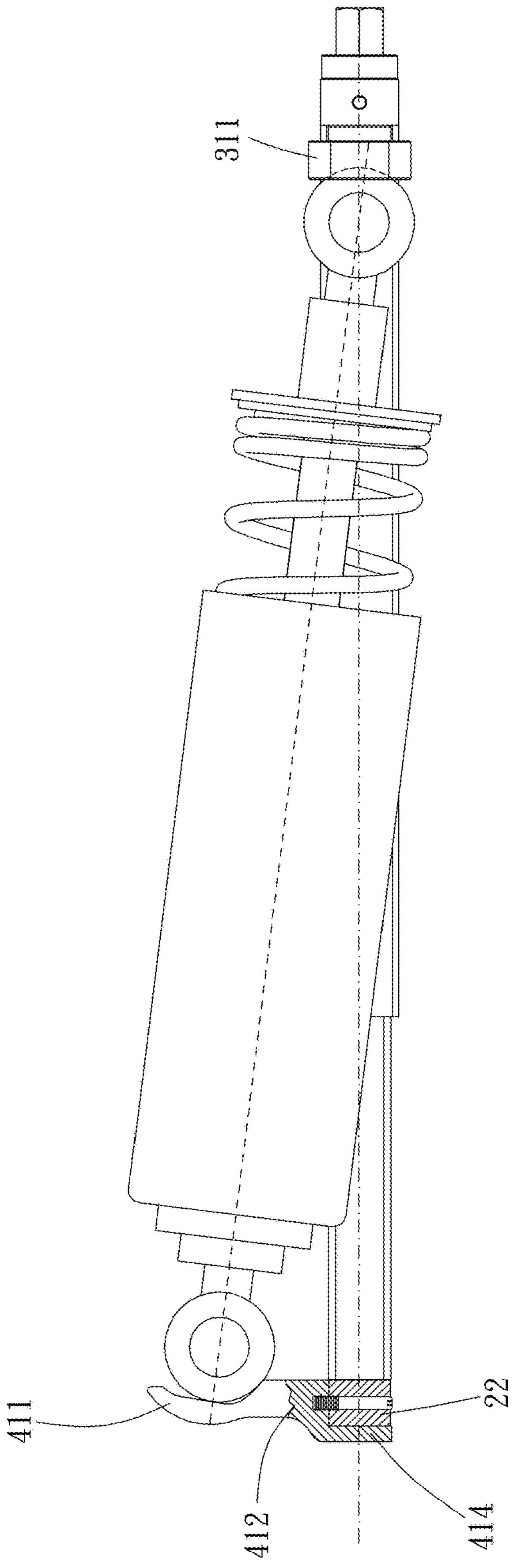
FIG. 8 is a top view of FIG. 6.

Please refer to FIGS. 1 to 8 for a preferable embodiment of the present invention. A compressor for a shock absorber 8 is provided, and the shock absorber 8 includes a first assembling head 81, a suspension unit 82 and a second assembling head 83 which are connected with one another. The shock absorber 8 may be a shock absorber for a steering system of a vehicle, and the first assembling head 81 and the second assembling head 83 are respectively configured as a hanging ear to be assembled to the steering system by a fastener.

The compressor for the shock absorber 8 includes a stretching mechanism and a clamping mechanism. The stretching mechanism includes a first main body 11, a second main body 12, a linkage assembly 13 and a driving unit 14. The first main body 11 and the second main body 12 are disposed on the linkage assembly 13. The linkage assembly 13 selectively drives the first main body 11 and the second main body 12 to move relative to each other along an operating direction 6. The driving unit 14 is connected and co-movable with the linkage assembly 13. The driving unit 14 is configured to be connected with a driving tool 7 to drive the linkage assembly 13 to drive the first main body 11 and the second main body 12. The clamping mechanism is configured to clamp the shock absorber 8 and includes a first abutting assembly 2 and a second abutting assembly 3. The first abutting assembly 2 is disposed on the first main body 11 and configured to be abutted against the first assembling head 81, and the second abutting assembly 3 is disposed on the second main body 12 and configured to be abutted against the second assembling head 83.

For assembling the shock absorber 8 to the vehicle (or other targets), the shock absorber 8 is pre-pressed by the compressor and a distance between the first assembling head 81 and the second assembling head 83 are adjustable to meet an assembling position of the vehicle so that the shock absorber 8 is unnecessary to be pushed by hands, which is labor-saving and convenient to be assembled quickly. For disassembling the shock absorber 8 from the vehicle, the compressor is used to keep the shock absorber 8 being compressed, and then said fasteners are removed from the shock absorber 8, which effectively prevents the shock absorber 8 from being stretched unexpectedly and greatly increases safety of disassembling the shock absorber 8.

The first abutting assembly 2 includes a first arm 22 and a first abutting member 21 disposed on the first arm 22 and configured to be abutted against the first assembling head 81, and the first arm 22 is undetachably disposed on the first main body 11. The second abutting assembly 3 includes a second arm 32 and a second abutting member 31 disposed on the second arm 32 and configured to be abutted against the second assembling head 83, and the second arm 32 is undetachably disposed on the second main body 12. Therefore, the first arm 22 and the first main body 11 have good connection stability and structural strength, which ensures operational safety of the compressor for the shock absorber 8.

In this embodiment, the first arm 22 is partially disposed within the first main body 11, and at least one pin 91 penetrates within the first main body 11 and the first arm 22 to connect one another. At least one sealing member 92 is undetachably disposed on the first main body 11 and covers the at least one pin 91 by glue or welding. A junction between the at least one sealing member 92 and the first main body 11 may be ground or polished for preferable appearance. Similarly, the second arm 32 and the second main body 12 are assembled with each other in the same manner.

Moreover, the first main body 11 and the second main body 12 are respectively a hollow straight tube and sleeved with each other along the operating direction 6. Specifically, the first main body 11 and the second main body 12 are circular tubes which have smooth contours and avoid unexpected interference with external environment. The first main body 11 further has at least one groove 111 extending along the operating direction 6, and the second main body 12 further has at least one guiding member 121. The at least one guiding member 121 is disposed within the at least one groove 111, which allows the first main body 11 to be non-rotatably movable along the operating direction 6 relative to the second main body 12. In addition, the first arm 22 is L-shaped, and a part of the first arm 22 disposed within the first main body 11 is cylindrical.

The first abutting member 21 includes a first abutting portion 211 configured to be abutted against the first assembling head 81, and the second abutting member 31 includes a second abutting portion 311 configured to be abutted against the second assembling head 83. The first abutting portion 211 and the second abutting portion 311 are coaxially arranged in the operating direction 6 and face each other. In the operating direction 6, the first abutting portion 211 and the second abutting portion 311 are located between the first arm 22 and the second arm 32, and an imaginary line between the first abutting portion 211 and the second abutting portion 311 is parallel to the operating direction 6. Therefore, the operating direction 6 is parallel to a compression direction of the shock absorber 8, which provides sufficient force to compress the shock absorber 8.

The first abutting member 21 further includes a first connecting portion 213 and a first positioning portion 214 disposed on the first connecting portion 213, and the first arm 22 has a first assembling hole 221 and a first positioning hole 222. An opening direction of the first assembling hole 221 is parallel to the operating direction 6, and an opening direction of the first positioning hole 222 is lateral to the operating direction 6. The first connecting portion 213 is disposed within the first assembling hole 221, and a first positioning member 51 is disposed on the first arm 22 and penetrates through the first positioning hole 222 to be restricted with the first positioning portion 214. In this embodiment, the first positioning portion 214 is recessed on the first connecting portion 213, and the first positioning member 51 protrudes within the first positioning portion 214 and interferes with the first connecting portion 213 in the operating direction 6 so that the first abutting member 21 is stably connected with the first arm 22.

Preferably, a structure of the second abutting member 31 and a structure of the first abutting member 21 are the same and assembled in the same manner. Accordingly, the second arm 32 has a second assembling hole 321 and a second positioning hole 322. The second assembling hole 321 is coaxial with the first assembling hole 221, and an opening direction of the second positioning hole 322 is lateral to the operating direction 6. A second connecting portion 312 of the second abutting member 31 is disposed within the second assembling hole 321, and a second positioning member 52 is disposed on the second arm 32 and penetrates through the second positioning hole 322 to be restricted with a second positioning portion 313 of the second abutting member 31.

Therefore, the first abutting member 21 and the second abutting member 31 are respectively detachably assembled to the first arm 22 and the second arm 32, which is convenient for storage and replacement. Moreover, the clamping mechanism preferably further includes a third abutting member 41 which provides different configuration to meet one of various requirements. The third abutting member 41 is detachably assembled to the first arm 22. The third abutting member 41 includes a third abutting portion 411, and an imaginary line between the third abutting portion 411 and the second abutting portion 311 is oblique to the operating direction 6.

Specifically, a structure of the third abutting member 41 is different from the structure of the first abutting member 21. The first abutting portion 211 defines a receiving space 212 being closed laterally, and the receiving space 212 is configured to receive at least a part of the first assembling head 81. The third abutting portion 411 is an arched board. When a side of the shock absorber 8 is in a narrow space, the third abutting portion 411 is convenient to protrude into the narrow space and be abutted against the shock absorber 8. In addition, the arched board is also beneficial to increase a contact surface with the first assembling head 81 or the second assembling head 83 so as to have good stability.

The third abutting member 41 further includes a base 412 and at least one connecting hole 413. The third abutting portion 411 and the at least one connecting hole 413 are respectively disposed at two opposite sides of the base 412. The first arm 22 has a third assembling hole 223, and a connecting member 53 is selectively disposed on the first arm 22 and penetrates through the third assembling hole 223 and within the at least one connecting hole 413. In addition, the third abutting member 41 preferably further includes a supporting portion 414. The supporting portion 414 is protrudingly disposed at a side of the base 412 relative to the third abutting portion 411, and the supporting portion 414 is abutted against the first arm 22 in the operating direction 6. When the third abutting portion 411 is pressed against the shock absorber 8 at a side of the base 412, the first arm 22 provides supporting force to the supporting portion 414 at another side of the base 412 so as to offset a torque generated between the third abutting portion 411 and the shock absorber 8. Therefore, the third abutting member 41 is stably pressed against the shock absorber 8.

In this embodiment, opening directions of the third assembling hole 223, the first assembling hole 221 and the first positioning hole 222 are vertical to one another so that the first arm 22 is selectively assembled with the first abutting member 21 or the third abutting member 41. The second arm 32 further has a fourth assembling hole 333 which has the same structure and function with the third assembling hole 223 so that the third abutting member 41 is detachable from the second arm 32, which provides a variety of configurations in application.

The linkage assembly 13 includes a screw rod 131 and a moving member 132. The screw rod 131 is rotatably disposed on the second main body 12 and penetrates within the first main body 11, and the moving member 132 is movably screwed with the screw rod 131. The first main body 11 is connected and co-movable with the moving member 132, and the driving unit 14 is disposed on an end of the screw rod 131 and configured to be assembled with the driving tool 7 (Such as pneumatic rotating tools or electric rotating tools) to drive the screw rod 131 to rotate.

The first main body 11 is connected insertedly with the second main body 12. The moving member 132 includes a head portion 133, a body portion 134 and a screw hole 135. The head portion 133 is connected with the body portion 134, and the screw hole 135 extends through the head portion 133 and the body portion 134. The body portion 134 is disposed within the first main body 11, and the head portion 133 is exposed out of the first main body 11 and abutted against the first main body 11 in the operating direction 6. During assembling, the head portion 133 is blockable by the first main body 11 so that the body portion 134 is accurately assembled within the first main body 11, which is convenient for quickly assembling. The body portion 134 is a cylinder, and the head portion 133 is a round block.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A compressor for a shock absorber, the shock absorber including a first assembling head, a suspension unit and a second assembling head which are connected with one another, the compressor for the shock absorber including:

a stretching mechanism, including a first main body, a second main body, a linkage assembly and a driving unit, the first main body and the second main body being disposed on the linkage assembly, the linkage assembly selectively driving the first main body and the second main body to move relative to each other along an operating direction, the driving unit connected and being co-movable with the linkage assembly, the driving unit configured to be connected with a driving tool to drive the linkage assembly to drive the first main body and the second main body;

a clamping mechanism, configured to clamp the shock absorber and including a first abutting assembly and a second abutting assembly, the first abutting assembly disposed on the first main body and configured to be abutted against the first assembling head, the second abutting assembly disposed on the second main body and configured to be abutted against the second assembling head;

wherein the first abutting assembly includes a first arm and a first abutting member disposed on the first arm and configured to be abutted against the first assembling head, the first arm is undetachably disposed on the first main body; the second abutting assembly includes a second arm and a second abutting member disposed on the second arm and configured to be abutted against the second assembling head, and the second arm is undetachably disposed on the second main body;

wherein the first abutting member includes a first abutting portion configured to be abutted against the first assembling head, the second abutting member includes a second abutting portion configured to be abutted against the second assembling head, and the first abutting portion and the second abutting portion are coaxially arranged in the operating direction and face each other;

wherein the first abutting member further includes a first connecting portion and a first positioning portion disposed on the first connecting portion, the first arm has a first assembling hole and a first positioning hole, an opening direction of the first assembling hole is parallel to the operating direction, an opening direction of the first positioning hole is lateral to the operating direction; the first connecting portion is disposed within the first assembling hole, a first positioning member is disposed on the first arm and penetrates through the first positioning hole to be restricted with the first positioning portion; a structure of the second abutting member and a structure of the first abutting member are the same, the second arm has a second assembling hole and a second positioning hole, the second assembling hole is coaxial with the first assembling hole, an opening direction of the second positioning hole is lateral to the operating direction, a second connecting portion of the second abutting member is disposed within the second assembling hole, a second positioning member is disposed on the second arm and penetrates through the second positioning hole to be restricted with a second positioning portion of the second abutting member.

2. The compressor for the shock absorber of claim 1, wherein the first main body and the second main body are respectively a hollow straight tube and sleeved with each other along the operating direction, the linkage assembly includes a screw rod and a moving member, the screw rod is rotatably disposed on the second main body and penetrates within the first main body, the moving member is movably screwed with the screw rod, the first main body is connected and co-movable with the moving member, and the driving unit is disposed on an end of the screw rod and configured to be assembled with the driving tool to drive the screw rod to rotate.

3. The compressor for the shock absorber of claim 2, wherein the first main body is connected insertedly with the second main body, the moving member includes a head portion, a body portion and a screw hole, the head portion is connected with the body portion, the screw hole extends through the head portion and the body portion, the body portion is disposed within the first main body, the head portion is exposed out of the first main body and abutted against the first main body in the operating direction.

4. A compressor for a shock absorber, the shock absorber including a first assembling head, a suspension unit and a second assembling head which are connected with one another, the compressor for the shock absorber including: a stretching mechanism, including a first main body, a second main body, a linkage assembly and a driving unit, the first main body and the second main body being disposed on the linkage assembly, the linkage assembly selectively driving the first main body and the second main body to move relative to each other along an operating direction, the driving unit connected and being co-movable with the linkage assembly, the driving unit configured to be connected with a driving tool to drive the linkage assembly to drive the first main body and the second main body; a clamping mechanism, configured to clamp the shock absorber and including a first abutting assembly and a second abutting assembly, the first abutting assembly disposed on the first main body and configured to be abutted against the first assembling head, the second abutting assembly disposed on the second main body and configured to be abutted against the second assembling head;

wherein the first abutting assembly includes a first arm and a first abutting member disposed on the first arm and configured to be abutted against the first assembling head, the first arm is undetachably disposed on the first main body; the second abutting assembly includes a second arm and a second abutting member disposed on the second arm and configured to be abutted against the second assembling head, and the second arm is undetachably disposed on the second main body;

wherein the first abutting member includes a first abutting portion configured to be abutted against the first assembling head, the second abutting member includes a second abutting portion configured to be abutted against the second assembling head, and the first abutting portion and the second abutting portion are coaxially arranged in the operating direction and face each other;

wherein the first abutting member and the second abutting member are respectively detachably assembled to the first arm and the second arm, the clamping mechanism further includes a third abutting member which is detachably assembled to the first arm, the third abutting member includes a third abutting portion, and an imaginary line between the third abutting portion and the second abutting portion is oblique to the operating direction.

5. The compressor for the shock absorber of claim 4, wherein a structure of the second abutting member is the same as a structure of the first abutting member, a structure of the third abutting member is different from the structure of the first abutting member; the third abutting member further includes a base and at least one connecting hole, the third abutting portion and the at least one connecting hole are respectively disposed at two opposite sides of the base; the first arm has a third assembling hole, and a connecting member is selectively disposed on the first arm and penetrates through the third assembling hole and within the at least one connecting hole.

6. The compressor for the shock absorber of claim 5, wherein the third abutting member further includes a supporting portion, the supporting portion is protrudingly disposed at a side of the base relative to the third abutting portion, and the supporting portion is abutted against the first arm in the operating direction.

* * * * *